United States Patent [19]

Guibet

[11] 4,213,771
[45] Jul. 22, 1980

[54] FILTER AND METHOD OF MAKING

[75] Inventor: Jean-Pierre Guibet, Vernon, France

[73] Assignee: Air Industrie, Cedex, France

[21] Appl. No.: 921,813

[22] Filed: Jul. 3, 1978

[30] Foreign Application Priority Data

Jul. 5, 1977 [FR] France ............................. 77 20690

[51] Int. Cl.² .............................................. B01D 46/52
[52] U.S. Cl. ......................................... 55/483; 55/484;
55/491; 55/500; 55/502; 55/DIG. 12; 55/DIG. 5; 112/262.2
[58] Field of Search .................................. 55/380–382, 55/483, 484, 500–502, DIG. 12, 491; 210/323 T; 112/262.2

[56] References Cited

U.S. PATENT DOCUMENTS

| 1,049,789 | 1/1913 | Williamson | 55/484 |
| 2,980,208 | 4/1961 | Neumann | 55/500 |
| 3,276,190 | 10/1966 | Babbitt et al. | 55/381 |
| 3,289,395 | 12/1966 | Getzin | 55/381 |
| 3,309,848 | 3/1967 | Schwab | 55/380 |
| 3,386,232 | 6/1968 | Gaines, Jr. | 55/500 |
| 3,394,534 | 7/1968 | Andrews et al. | 55/501 |
| 3,400,519 | 9/1968 | Korn et al. | 55/484 |
| 3,479,803 | 11/1969 | Smith | 55/484 |
| 3,505,795 | 4/1970 | Wurtenberg | 55/DIG. 12 |
| 3,880,628 | 4/1975 | Gustavsson et al. | 55/500 |

FOREIGN PATENT DOCUMENTS 1000457 8/1965 United Kingdom ..................... 55/381

Primary Examiner—David L. Lacey
Attorney, Agent, or Firm—Daniel M. Rosen; J. David Dainow

[57] ABSTRACT

A pocket filter in the form of a filtering block is provided with an assembly of channels open at one end to receive gas from which dust is to be removed, and is interleaved with the channels of another assembly open towards the other end and delivering the gas from which the dust has been removed. These channels have a generally square-shaped cross-section, and are connected to each other, for example by stitching lines, along their edges. During operation, the initial shape provided for the cross-section of the channels of the two above mentioned assemblies is maintained by tensioning these two assemblies with tensioners or the like, on which are fixed the edges of the outer channels of the filtering block.

9 Claims, 3 Drawing Figures

U.S. Patent  Jul. 22, 1980  4,213,771
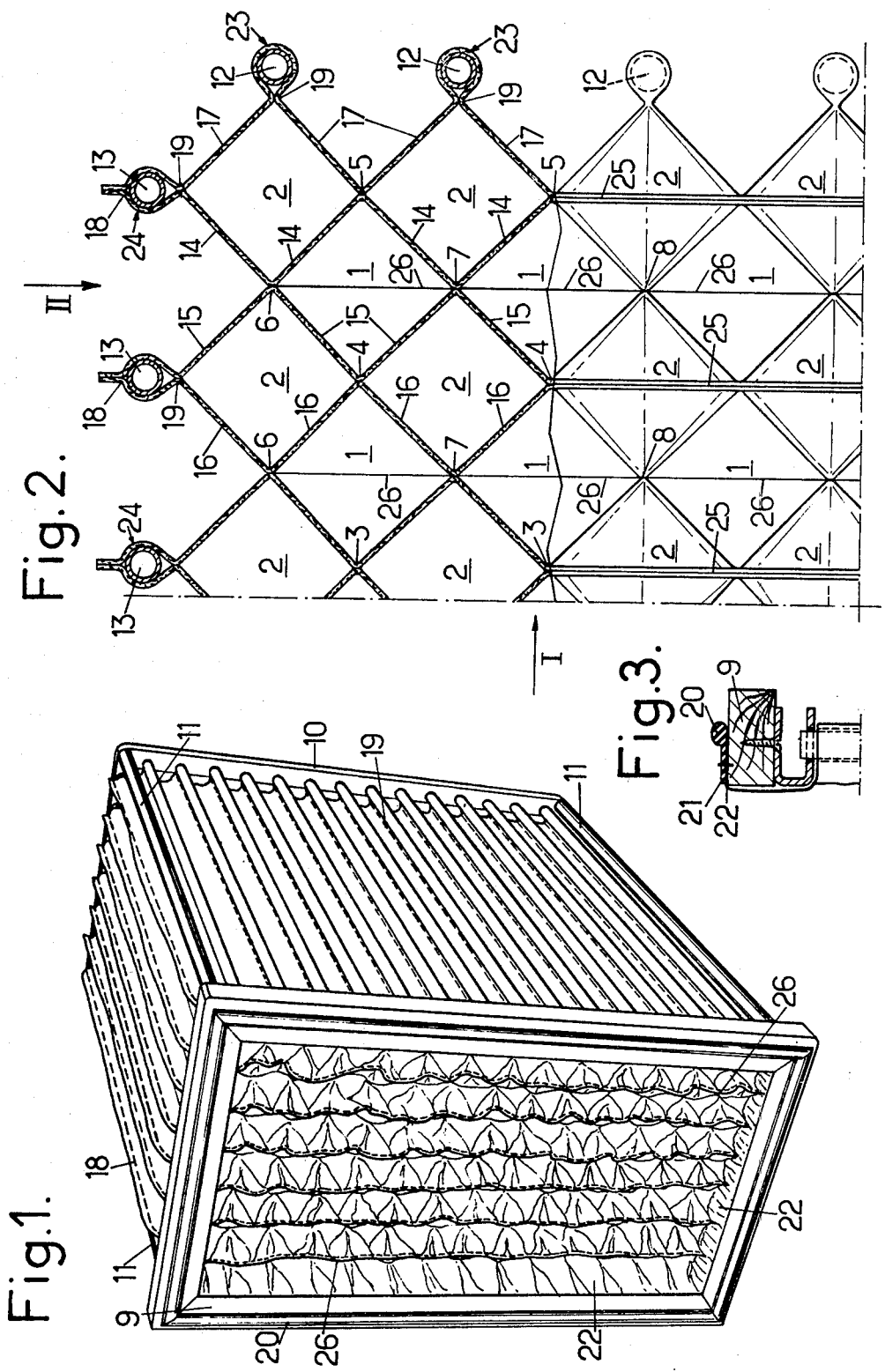

FILTER AND METHOD OF MAKING

The present invention relates to a filter of the type comprising an assembly of first channels with filtering walls, disposed in first rows parallel to each other and open at one end of the block so as to connect with an inlet for gas from which dust is to be removed. An assembly of second channels, with filtering walls, is disposed in second rows parallel to each other, adjacent and parallel to the first rows, intercalated therewith. These second channels are open at the opposite end of said block so as to connect with an outlet for the gas from which the dust has been removed, the first and second channels having a polygonal cross-section, for example square, so that said first and second rows are interleaved, the walls of the first channels being adjacent the walls of the second.

In known filters of this kind referred to hereinafter as pillow blocks, fitted into at least a part of the channels, particularly in those channels which are open towards the upper end of the filtering block, to make the two assemblies of channels rigid and to prevent their cross-section from being deformed. To this end, if this cross-section is square, these frames comprise vertical rods in contact with the opposite edges of the channels, these frames extending accordingly along one or more diagonals of these channels. The result is a considerable increase in the weight and cost of such filtering blocks, with appreciable mounting complications.

The object of the present invention is to remedy these disadvantages. To accomplish the foregoing object, a filtering block of the type mentioned above is, in accordance with the invention, characterized in that adjacent channels of first rows extending in a first direction of the block are connected in pairs substantially over their length along fixed lines, particularly stitching lines, extending along their common edges and aligned in said first direction. The adjacent channels of first rows extend in a second direction perpendicular to the first, being likewise connected in pairs substantially over their length along fixed lines, particularly stitching lines, extending along their common edges, and aligned in said second direction. This allows a similar arrangement to be obtained for the channels of said second rows. Also a means are provided for tensioning the assemblies of channels, in a first direction, and in a second direction, so as to preserve the shape of the polygonal cross-section of the channels. Thus, two assemblies of the channels may be conveniently made indeformable, without using inner frames and, likewise, their polygonal cross-section can maintain the shape which was initially provided, even with a considerable pressure difference between the input and the output.

In a particularly advantageous practical embodiment of the invention, a filtering block of the type mentioned is furthermore provided with a first frame for fixing the ends of the outer channels of the block towards one of said ends thereof, and a second frame situated towards the other end thereof. These two frames, preferably rectangular, are inter-connected by connecting bars, particularly at their facing angles, and the means for tensioning the assemblies of channels are formed by tensioners, in the form of tubes, extending between the two frames and which maintain them in position, the outer channels being fixed on these tensioners by and along their edges.

In so far as the formation of the channels themselves is concerned, it is advantageous to arrange a filtering block such that in either direction, each of said first rows of first channels, except possibly the extreme first rows, is provided between two folded strips of filtering fabric, connected at regular intervals by fixed lines, particularly first stitching lines, forming two of the edges of said first channels and aligned in said direction. One of these strips is connected along fixed lines, such as stitching lines, to another folded strip of filtering fabric to form therebetween the adjacent second row, offset by half a gap in relation to the first, and forming two of the edges of said second channels of said second adjacent row, as well as one of the other edges of said first channels, which extend in said first direction, and so on. Thus the desired number of channels can be obtained, in both said directions, in a particularly simple and rapid fashion.

In accordance with another advantageous aspect of the invention, the filtering block may achieve the fixing of the edges of the outer channels on the tensioners, disposed along one of the sides of said block, by passing the corresponding strip of filtering fabric behind said tensioners (in relation to the inside of the block), at the level of said edges. The fixing of the edges of the outer channels on the tensioners disposed along the adjacent side of said block is effected by assembling the ends of the two adjacent strips of filtering fabric, behind said tensioners (in relation to the inside of the block) with a connecting line, particularly a stitching line. Preferably, a fixed line, such as a stitching line, will also be provided in front of each of said tensioners, i.e. towards the inside of said block.

To ensure the necessary seal for the dust free gas between the filtering block and the output manifold, the frame situated towards the dust free gas outlet which frame is preferably made from wood or the like, is provided with a surrounding seal, particularly a rubber seal. The cross-section of the seal is in the shape of the small letter sigma and is stapled, by its veil, to said frame.

In this case, it will be particularly convenient to arrange for the corresponding ends of the outer channels to be bent back over said frame, between the frame and the seal, and fixed there by stapling, at the same time as the veil of the seal.

The invention further concerns a process for manufacturing a filtering block such as defined above. Since folded strips of fabric are provided to extend in the aggregate in one of said directions, one begins by forming regularly spaced stitching lines, in said direction, on the outer strip. These lines, intended to be passed behind the corresponding tensioners, results in sleeves or loops of fabric open at the ends, for passing said tensioners disposed along one of the sides of the block, and for maintaining the fabric in position during later operations. With stitching lines, the ends of these strips are fixed in twos, resulting in sleeves for passing the tensioners disposed along the adjacent side of said block. Finally, rows of stitching lines are provided row by row, progressing in said direction, either from one side to the other of the block, or from the middle towards one of the sides, then from the middle towards the other side, for fixing the strips in twos with even spacing.

An embodiment of the invention is described below by way of a nonlimiting example, with reference to the figures of the accompanying drawing, in which:

FIG. 1 is a perspective view of a filtering block according to the invention;

FIG. 2 is a partial representation showing partly in cross-section and partly in a bottom view the two channel assemblies of the filtering block of FIG. 1; and FIG. 3 is a partial cross-sectional view showing the fixing of the ends of the channels and of the seal on one of the frames of the filtering block.

The filtering block has been shown in FIG. 1 lying on its side for the sake of convenience, but in operation it will in principal be disposed vertically, frame 9 bearing the seal 20 being situated at the top and the metal frame 10 at the bottom. (The reverse is also possible: seal 20 at the bottom).

Considered in this position, the block comprises an assembly of channels 1 disposed in parallel rows (in the direction I), open at the bottom and closed at the top, these channels being intended to receive the gas from which dust is to be removed. The block further comprises channels 2 disposed in rows parallel to each other and parallel to the preceeding ones, interleaved therewith, these channels 2 being closed at the bottom and open at the top to receive, from channels 1, gas from which the dust has been removed, the dust being deposited on the inner faces of the walls of channels 1, whose outer faces form the inner faces of the walls of channels 2 and conversely.

Advantageously, channels 1 and 2 have a square cross-section so that a simple structure is thus obtained, with rows of channels 1 and 2 extending, while being interleaved with each other and overlapping, in two perpendicular directions I and II, parallel respectively to the large and small sides of the block. The block has the general shape of a parallelepiped, this arrangement being obtained with walls of filtering fabric common to each channel and to the adjacent channel(s).

In accordance with the invention, adjacent channels 1 in the rows which extend parallel to the direction I are connected laterally in rows substantially over the whole of their length (along the height of the filtering block), by stitching lines such as 3,4,5 extending along their common edges, these edges being aligned in said direction I. Likewise, adjacent channels 1 in the rows which extend parallel to the direction referenced II are connected laterally in pairs substantially over the whole of their length, by stitching lines such as 6,7,8, extending along their common edges, aligned in said direction II. Thus the same arrangements can be obtained for channels 2 in both said directions.

The invention provides further means for tensioning the channels, acting in the aggregate on the assemblies of channels 1 and 2, more exactly for tensioning their walls, and for maintaining the square shape of their cross-section. For this purpose, the assemblies of channels are maintained in position by the edges of the outer channels (which are for example channels 2, i.e. channels for receiving the clean gas), with tensioning in both directions I and II of the block. Advantageously, to this end the block includes a first frame 9, made preferably from wood, placed for example on a metal flame (not visible in the drawing), for fixing the upper ends of channels 2 and a second metal frame 10 (lower frame). These two frames, being rectangular, are connected by connecting bars 11 at the level of their facing angles.

The means for tensioning said assemblies of channels 1 and 2 may then be formed by tensioners 12, 13, advantageously tubular, spread out with even spacing along the four sides of the block, and fixed by their ends to the above mentioned metal frames. All that is then required is to provide means for fixing the edges of the outer channels 2 to these tensioners.

Before describing these fixing means in more detail, it is advisable to show how the two assemblies of interleaved channels 1 and 2 are obtained in practice, according to the invention. In direction II, for example each row of channels 1 is provided between two strips of filtering fabric such as 14,15, connected with equal spacing by said stitching lines 6,7,8, thus forming the two edges of channels 1 which are aligned in this direction II. Strip 15 is fixed, on the other side, to another strip of filtering fabric 16, between which channels 2 are to be formed. For this purpose, and so as to obtain the general structure described above, strip 16 is fixed to strip 15 by stitching lines 4 offset by half a gap in relation to lines 6,7,8. These seams 4 thus form two of the edges of the channels 2, as well as one of the two other edges 4,5 of the first channels 1 of the adjacent row. Such being the case, the edges of outer channels 2 are conveniently fixed to tensioners 12 by arranging the corresponding strip of filtering fabric 17 to pass behind these tensioners, at the places provided for the corresponding edges, and by providing stitching lines 19 to be placed in front of said tensioners. It will be understood that seams 19 are effected before mounting, so as to form sleeves 23 for passing the tensioners, as described further below.

As to the securing of the edges of outer channels 2 to tensioners 13, the ends of two adjacent strips of filtering fabric 14,17 and 15, 16 for example, are assembled by stitching lines 18 and 19 forming therebetween sleeves 24 through which pass said tensioners 13. The different seams will be advantageously prepared as follows:

First of all, seams 19 are formed at even intervals along the strip of filtering fabric 17 to form the sleeves 23; then, seams 18 and 19 are formed to connect in twos the ends of the different strips and thus to form sleeves 24. Next, seams 6 can be formed, then seams 3,4,5 which permits the first row (on the left in FIG. 2) of channels 2 to be obtained. Then, the formation of seams 7 will permit the first row of channels 1 to be obtained, the formation of the following seams 3,4,5 (in the direction of arrow II), will permit a second row of channels 2 to be obtained, the formation of seams 8, the second row of channels 1, and so on. We could also proceed similarly, but by beginning with the central part (for example by beginning with seam 8), and by progressing in direction II as far as one end, then from this central part towards the opposite end, after having turned the work piece over, which would reduce by half the length of the strips in the clearance of the sewing machine, and would thus facilitate handling.

In any case, the essential thing is that the successive rows of seams be effected one after the other while progressing in direction II. When all these seams have been effected, there will be formed, at the lower ends of channels 2, so as to close them at the bottom, diagonal stitching lines such as 25 and, at the upper ends of channels 1, so as to close them at the top, diagonal stitching lines such as 26.

Finally, a filtering block in accordance with the invention may be further characterized by the provision of means ensuring the seal between the block and the plate (of the clean gas discharge manifold), on which it is meant to be mounted. It may be advantageously arranged, for this purpose, for the wooden frame 9 to be provided, along the whole of its periphery, with a flexible rubber seal 20 having a cross-section in the form of a small letter sigma, the lip 21 of the seal being turned inwardly. Then there will be folded back, over the wooden frame 9, between it and lip 21, the upper ends 22 of the walls of outer channels 2, and the assembly can then be conveniently fixed to frame 9, for example by stapling to this latter lip 21, at the same time as said upper ends 22.

After positioning, a better seal will be obtained between the block and its plate since the pressure of the gas from which the dust is to be removed, being substantially greater than that of the clean gas, will press frame 9 against the plate while compressing seal 20.

It has been discovered, after tests, that, during operation, the assemblage of channels 1 and 2 was held in position in an excellent manner and that square cross-section of the channels was perfectly preserved, despite the absence of any inner framework. Thus a considerable saving in weight, a lower manufacturing cost and simplified mounting is obtained. Furthermore, there are no longer "inactive" surfaces of filtering fabric, which is the case when frames are used, and all wear at the edges of the channels is eliminated. The fact of having common filtering walls between the channels eliminates likewise all friction between walls otherwise resulting between adjacent walls of channels in conventional filtering blocks.

I claim:

1. An improved filter having an assembly of a material from which there are formed first channels with filtering walls, disposed in first parallel rows open at one end of said filter so as to be in communication with an inlet for gas from which dust is to be removed, and an assembly of second channels with filtering walls, disposed in second rows parallel to each other, adjacent, interleaved and also parallel to said first rows, said second channels being open at the opposite end of said filter so as to be in communication with an outlet for said gas from which the dust has been removed, said first and second channels having a polygonal cross-section, said first and second rows, overlying one another, the walls of said first channels being adjacent the walls of said second channels, the improvement comprising adjacent channels of said first rows extending in a first direction of said filter connected in pairs substantially over the whole of their length along fixed lines extending along their common edges and aligned in said first direction, the adjacent channels of said first rows extending in a second direction perpendicular to the first and being likewise connected in pairs substantially over the whole of their length along fixed lines extending along their common edges and aligned in said second direction, said arrangement resulting in the formation of the channels of said second rows, and means for tensioning the assemblies of said first and second channels in said first and second directions perpendicular to each other and perpendicular to the center line of said channels so as to maintain the polygonal shape of said cross-section of said channels, said tensioning means being disposed external to said channels and out of the path of gas flowing through said inlet and said outlet.

2. The filter according to claim 1, further comprising a first frame coupled to and fixing the ends of the channels of the filter proximate its exterior towards one of said ends thereof, and a second frame situated towards the other end thereof, said two frames connected by connecting bars at their facing portions, said means for tensioning the assemblies of channels being formed by tensioners extending between said frames to hold them in position, said channels being fixed to said tensioners, by and along the edges thereof.

3. The filter of claim 1 or 2, where in either said direction substantially each of said first rows of first channels is provided between two folded strips of filtering fabric connected at regular intervals by first fixing lines forming two of the edges of said first channels aligned in one of said first and second directions, one of said strips being connected, on the other side, to another folded strip of filtering fabric to form therebetween the second adjacent row, by second fixing lines offset in relation to said first fixing lines and forming two of the edges of said second channels of said second adjacent row, as well as one of the other edges of said first channels which extend in the other of said first and second directions.

4. The filter according to claim 2, wherein the edges of the outer ones of said second channels are fixed to ones of said tensioners disposed along one of the sides of said filter by passing a strip of filtering fabric behind said ones of said tensioners at the level of said edges, the edges of the channels being fixed to others of said tensioners disposed along the adjacent side of said filter by a connecting line along the ends of the two adjacent strips of filtering fabric behind said others of said tensioners.

5. The filter according to claim 4, wherein a further fixing line is positioned in front of each of said tensioners towards the inside of said filter.

6. The filter according to claim 2, wherein one of said first and second frames has a seal which surrounds it.

7. The filter according to claim 6, wherein said seal comprises at least one lateral veil, said seal having a cross-section in the shape of the small letter sigma, said seal stapled, through said veil to said frame.

8. The filter according to claim 7, wherein the corresponding ends of the channels are folded back over said frame, between said frame and said seal, and fixed by a staple which penetrates said veil.

9. A process for manufacturing a filter comprising the steps of,
   forming strips in pieces of filtering fabric by executing regular spaced stitching lines in the direction of said strips of filtering fabric,
   passing said strips behind one set of corresponding tensioners to form sleeves of loops of fabric for receiving said one set of tensioners disposed along one of the sides of said filter,
   fixing the ends of said strips by stitching lines thereby forming sleeves for receiving a second set of tensioners disposed along the adjacent side of said filter, and further executing, row by row, along said direction rows of further stitching lines for fixing the strips in pairs at regular intervals.

* * * * *

UNITED STATES PATENT AND TRADEMARK OFFICE
CERTIFICATE OF CORRECTION

PATENT NO. : 4,213,771

DATED : July 22, 1980

INVENTOR(S) : Jean-Pierre Guibet

It is certified that error appears in the above-identified patent and that said Letters Patent are hereby corrected as shown below:

On the title page, item [73] Assignee, remove "Cedex" and insert -- Courbevoie --.

Signed and Sealed this

Second Day of December 1980

[SEAL]

Attest:

SIDNEY A. DIAMOND

Attesting Officer

Commissioner of Patents and Trademarks